United States Patent
Liu et al.

(10) Patent No.: US 10,813,375 B2
(45) Date of Patent: Oct. 27, 2020

(54) CAFFEINE-ADSORBING MATERIAL, CAFFEINE-ADSORBING SYSTEM, DECAFFEINATION SYSTEM, AND RELATED METHODS OF REMOVING CAFFEINE FROM SOLUTIONS

(71) Applicant: Decafino, Inc., Seattle, WA (US)

(72) Inventors: Yu-Liang Liu, Seattle, WA (US);
Matthew Willett, Seattle, WA (US);
Chun-Chia Kao, Seattle, WA (US);
Muhamad Asyraaf Bin Said Muhamad Khalil, Seattle, WA (US)

(73) Assignee: Decafino, Inc., Seattle, WA (US)

( * ) Notice: Subject to any disclaimer, the term of this patent is extended or adjusted under 35 U.S.C. 154(b) by 0 days.

(21) Appl. No.: 16/095,312

(22) PCT Filed: May 19, 2017

(86) PCT No.: PCT/US2017/033564
§ 371 (c)(1),
(2) Date: Oct. 19, 2018

(87) PCT Pub. No.: WO2017/201420
PCT Pub. Date: Nov. 23, 2017

(65) Prior Publication Data
US 2019/0133153 A1    May 9, 2019

Related U.S. Application Data

(60) Provisional application No. 62/339,073, filed on May 19, 2016.

(51) Int. Cl.
*A23L 2/80* (2006.01)
*A23F 3/38* (2006.01)
(Continued)

(52) U.S. Cl.
CPC ............ *A23L 2/80* (2013.01); *A23F 3/385* (2013.01); *A23F 5/185* (2013.01); *B01J 20/12* (2013.01);
(Continued)

(58) Field of Classification Search
CPC .. A23L 2/80; A23F 3/385; A23F 5/185; B01J 20/12; B01J 20/18; B01J 20/24;
(Continued)

(56) References Cited

U.S. PATENT DOCUMENTS 2,375,550 A * 5/1945 Grossman ............... A23F 5/223
426/423
3,108,876 A * 10/1963 Turken .................... A23F 5/223
426/271
(Continued)

FOREIGN PATENT DOCUMENTS

DE       553758       6/1932
DE    19842858 A1    3/2000
(Continued)

OTHER PUBLICATIONS

International Search Report and Written Opinion dated Aug. 23, 2017, in corresponding Application No. PCT/US2017/033564, filed May 19, 2017, 10 pages.
(Continued)

*Primary Examiner* — Anthony J Weier
(74) *Attorney, Agent, or Firm* — Christensen O'Connor Johnson Kindness PLLC

(57) ABSTRACT

Caffeine-adsorbing materials, caffeine-adsorbing systems, and decaffeination system suitable for removing caffeine from a solution; methods for removing caffeine from a solution; and methods of making the caffeine-adsorbing materials are described.

17 Claims, 3 Drawing Sheets

(51) Int. Cl.
*A23F 5/18* (2006.01)
*B01J 20/12* (2006.01)
*B01J 20/18* (2006.01)
*B01J 20/24* (2006.01)
*B01J 20/26* (2006.01)
*B01J 20/28* (2006.01)
*C12H 1/056* (2006.01)
*B65D 85/808* (2006.01)

(52) U.S. Cl.
CPC .............. *B01J 20/18* (2013.01); *B01J 20/24* (2013.01); *B01J 20/267* (2013.01); *B01J 20/268* (2013.01); *B01J 20/2805* (2013.01); *B65D 85/808* (2013.01); *C12H 1/0424* (2013.01); *A23V 2002/00* (2013.01); *A23V 2300/02* (2013.01)

(58) Field of Classification Search
CPC .... B01J 20/267; B01J 20/268; B01J 20/2805; B65D 85/808; C12H 1/0424; A23V 2002/00; A23V 2300/02
See application file for complete search history.

(56) References Cited

U.S. PATENT DOCUMENTS

| | | | |
|---|---|---|---|
| 4,204,004 A * | 5/1980 | Farr | A23F 3/385 |
| | | | 426/385 |
| 4,481,223 A | 11/1984 | Hinman et al. | |
| 5,021,253 A | 6/1991 | Dawson-Ekeland et al. | |
| 5,603,830 A | 2/1997 | Everhart et al. | |
| 5,728,634 A | 3/1998 | Everhart et al. | |
| 5,906,743 A * | 5/1999 | Cohen | A23F 5/223 |
| | | | 210/502.1 |
| 2005/0016923 A1 | 1/2005 | Marquez-Sanchez et al. | |
| 2012/0193282 A1 | 8/2012 | Wolf et al. | |
| 2014/0187842 A1 | 7/2014 | Holaday et al. | |
| 2016/0192806 A1 | 7/2016 | Pikkemaat et al. | |
| 2016/0349153 A1 | 12/2016 | Mao et al. | |

FOREIGN PATENT DOCUMENTS

| | | |
|---|---|---|
| EP | 0008398 A1 | 3/1980 |
| EP | 0173297 A2 | 3/1986 |
| JP | 2013123662 A | 6/2013 |
| JP | 2014008497 A | 1/2014 |
| WO | 2013/148359 A1 | 10/2013 |
| WO | 2015/138556 A1 | 9/2015 |

OTHER PUBLICATIONS

Zarzar, A., et al., "Insights Into the Eco-Friendly Adsorption of Caffeine From Contaminated Solutions by Using Hydogel Beads," Environmental Analytical Chemistry 2(4):1-5, 2015.

Mohamad Admin, M.F., et al., "Clay-Starch Combination for Micropollutants Removal From Wastewater Treatment Plant Effluent," Water Science & Technology, Apr. 30, 2016, 9 pages.

Sanford, S., et al., "Study of Natural Adsorbent Chitosan and Derivatives for the Removal of Caffeine From Water," Water Quality Research Journal, Feb. 29, 2012, vol. 47, 11 pages.

Ncibi, M.C., et al., "Remediation of Emerging Pollutants in Contaminated Wastewater and Aquatic Environments: Biomass-Based Technologies," Review in CLEAN Soil Air Water, Feb. 20, 2017, vol. 45, No. 5, 19 pages.

Akhtar, J., et al., "A Review on Removal of Pharmaceuticals From Water by Adsorption," Desalination and Water Treatment, Jun. 25, 2015, 19 pages.

Karaer, H., and I. Kaya, "Synthesis, Characterization of Magnetic Chitosan/Active Charcoal Composite and Using at the Adsorption of Methylene Blue and Reactive Blue4," Microporous and Mesoporous 232:26-38, Sep. 2016.

Hernández-Hernández, K.A., et al., "Polymer-Clay Nanocomposites and Composites: Structures, Characteristics, and Their Applications in the Removal of Organic Compounds of Environmental Interest," Medicinal Chemistry 6:3, Mar. 2016, 10 pages.

International Preliminary Report on Patentability and Written Opinion dated Nov. 29, 2018, issued in corresponding Application No. PCT/US2017/033564, filed May 19, 2017, 8 pages.

Extended European Search Report, dated Dec. 6, 2019, for European Patent Application No. 17800246.5. (10 pages).

Yamamoto, K. et al., "Interaction of caffeine with montmorillonite," Particulate Science and Technology, 2017. (9 pages).

Chaudry, N.C. et al., "Sustained Release of Drugs From Ion Exchange Resins," Physical Chemistry Dept. School of Pharmacy, University of London, Jul. 9, 1956. (7 pages).

* cited by examiner

CAFFEINE-ADSORBING MATERIAL, CAFFEINE-ADSORBING SYSTEM, DECAFFEINATION SYSTEM, AND RELATED METHODS OF REMOVING CAFFEINE FROM SOLUTIONS

CROSS-REFERENCE(S) TO RELATED APPLICATION(S)

This application claims the benefit of U.S. Application No. 62/339,073, filed May 19, 2016, which is expressly incorporated herein by reference in its entirety.

BACKGROUND

Several known decaffeination techniques may be used to remove caffeine from caffeinated solutions, including caffeinated beverages. Current decaffeination processes are typically performed on, for example, green coffee beans prior to roasting and to preparation of coffee beverages. Such conventional decaffeination processes can take 8-10 hours to complete.

Accordingly, there is currently an unmet need for materials and methods suitable to remove caffeine quickly and economically from solutions.

SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

The present invention provides caffeine-adsorbing materials, caffeine-adsorbing systems, and decaffeination system suitable for removing caffeine from a solution; methods for removing caffeine from a solution; and methods of making the caffeine-adsorbing materials.

In one aspect, the invention provides a caffeine-adsorbing material. In an embodiment, the caffeine-adsorbing material generally includes a crosslinked polymer and a caffeine adsorbent associated with the crosslinked polymer.

In a second aspect, the invention provides a caffeine-adsorbing system. In an embodiment, the caffeine-adsorbing system generally includes a porous container and a caffeine-adsorbing material disposed within the porous container. In certain embodiments, the caffeine-adsorbing material is according to any caffeine-adsorbing material described herein. In an embodiment, the porous container may be chosen from a paper bag, a cloth bag, a silk bag, a plastic bag, a metal tea ball, a woven fabric bag, and a nonwoven fabric bag.

In a third aspect, the invention provides a method of removing caffeine from a solution. In an embodiment, the method generally includes contacting the solution with a caffeine-adsorbing material for a time and under conditions sufficient to adsorb caffeine, thereby removing caffeine from the solution. In certain embodiments, the caffeine-adsorbing material is according to any caffeine-adsorbing material described herein. In certain embodiments, the solution may be a beverage. In certain embodiments, the beverage may be chosen from coffee, black tea, green tea, oolong tea, white tea, pu-erh tea, dark tea, herbal tea, floral tea, chai, macha, energy drink, alcohol-based drink, mate, soda, and cocoa.

In a fourth aspect, the invention provides a decaffeination system generally including a caffeine-containing solid and a caffeine-adsorbing material comprising a crosslinked polymer and a caffeine adsorbent associated with the crosslinked polymer. In an embodiment, the caffeine-containing solid may be chosen from coffee grounds, coffee crystals, coffee powder, tea leaves, and tea powder.

In an embodiment, the crosslinked polymer may be a crosslinked hydrogel.

In an embodiment, the crosslinked polymer comprises a crosslinked polysaccharide. In certain embodiment, the crosslinked polysaccharide may be chosen from cellulose, starch, glycogen, chitosan, dextran, alginate, agar, carrageenan, locust bean gum, guar gum, and pectin.

In an embodiment, the crosslinked polymer comprises a crosslinked protein or polypeptide. In certain embodiments, the crosslinked protein or polypeptide may be chosen from fibroin, elastin silk, collagen, keratin, and gelatin.

In an embodiment, the crosslinked polymer comprises a polymer and a crosslink, and wherein the crosslink is a multivalent ion. In certain embodiments, the multivalent ion may be a multivalent metal ion chosen from a multivalent ion of calcium, magnesium, manganese, iron, copper, cobalt, nickel, zinc, barium, selenium, chromium, and molybdenum. In an embodiment, the weight:weight ratio of the crosslink:polymer may be greater than 1:100.

In an embodiment, the caffeine-adsorbing material has a smallest diameter of between about 100 nm and about 10 mm. In an embodiment, the caffeine-adsorbing material may be in a shape chosen from a bead, a string, an oval, and a plate.

In an embodiment, the caffeine adsorbent is a clay particle. In certain embodiments, the clay particle comprises a material chosen from laponite, montmorillonite, beidellite, nontronite, hectorite, saponite, sauconite, sepiolite, and combinations thereof.

In an embodiment, the caffeine adsorbent is chosen from a molecular imprinted polymer, a zeolite, an ion-exchange resin, and activated carbon. In an embodiment, the caffeine adsorbent may be activated carbon, and wherein the activated carbon may be loaded with sucrose and formic acid.

In an embodiment, the ratio of crosslinked polymer to caffeine adsorbent may be between about 50:1 and about 1:50.

In an embodiment, the caffeine-adsorbing material may be thermostable at temperatures equal to or less than 150° C. In an embodiment, the caffeine-adsorbing material may be pH-stable at between about pH 2 and about pH 10.

DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION

Figure 1:
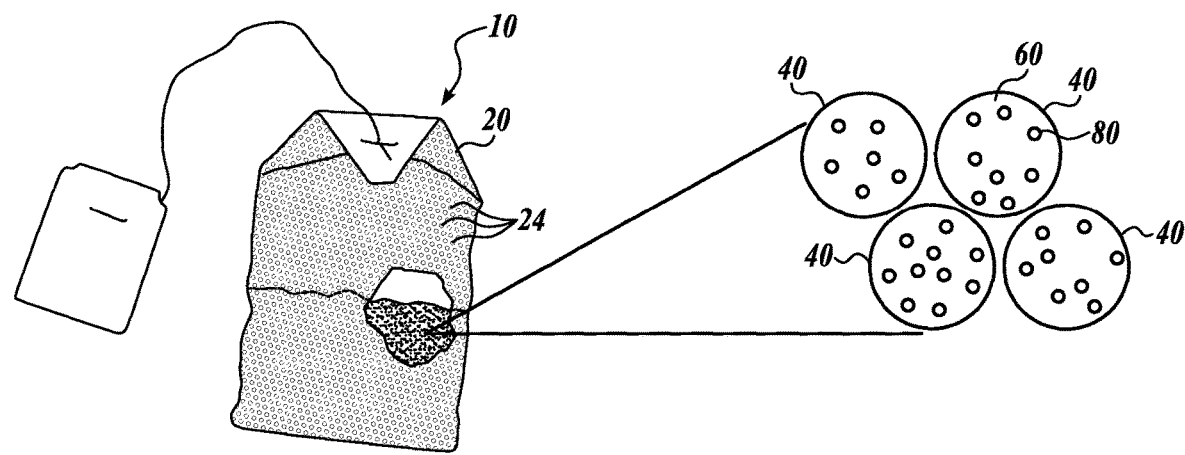
FIG. 1 is perspective view of a representative embodiment of a caffeine-adsorbing system in accordance with an aspect of the disclosure.

While illustrative embodiments have been illustrated and described, it will be appreciated that various changes can be made therein without departing from the spirit and scope of the invention.

The present invention provides caffeine-adsorbing materials, caffeine-adsorbing systems, and decaffeination system suitable for removing caffeine from a solution; methods for removing caffeine from a solution; and methods of making the caffeine-adsorbing materials.

Caffeine-Ad Sorbing Materials

In one aspect, the invention provides caffeine-adsorbing materials.

In one embodiment, the caffeine-adsorbing materials comprise a crosslinked polymer material and a caffeine adsorbent associated the crosslinked polymer material. As used herein, a crosslinked polymer comprises a polymer and a crosslink coupling a portion of the polymer to itself or to another polymer.

The crosslinked polymer material advantageously is associated with the caffeine adsorbent. Accordingly, when the caffeine-adsorbing material is in contact with a caffeine-containing solution, at least a portion of the caffeine is adsorbed by the caffeine adsorbent and, thereby removed from the solution. Further, if the caffeine-adsorbing material is not consumed by a user, the user does not ingest the caffeine which has been removed from the solution.

In an embodiment, the caffeine-adsorbing material comprises a crosslinked polymer, wherein the crosslinked polymer is porous. In an embodiment, the caffeine-adsorbing material comprises a crosslinked polymer, wherein the crosslinked polymer is water-permeable. Such porous and/or water-permeable crosslinked polymers allow diffusion of caffeine-containing solutions through the caffeine-adsorbing materials, thereby facilitating caffeine adsorption throughout the bulk of the caffeine-adsorbing material rather than only at or near the surface of the material. By allowing such mass transfer of a caffeine-containing solution across the caffeine-adsorbent materials, caffeine can be removed from the caffeine-containing solutions more efficiently than if the crosslinked copolymer were not porous and/or water-permeable. Further, in certain embodiments, the crosslinked polymer material is hydrophilic, thereby further facilitating mass transfer of aqueous, caffeine-containing solutions across the caffeine-adsorbing material.

In a further embodiment, the caffeine-adsorbing material comprises a crosslinked polymer, wherein the crosslinked polymer is a polysaccharide. In an embodiment, the caffeine-adsorbing material comprises a crosslinked polymer, wherein the crosslinked polymer is chosen from cellulose, starch, glycogen, chitosan, dextran, alginate, agar, carrageenan, locust bean gum, guar gum, and pectin. In an embodiment, the caffeine-adsorbing material comprises a crosslinked polymer, wherein the crosslinked polymer is alginate. Crosslinked polysaccharides have the advantage of being generally hydrophilic, thereby allowing diffusion of aqueous solutions, as described further herein.

In an embodiment, the caffeine-adsorbing material comprises a crosslinked polymer, wherein the crosslinked polymer is a protein or polypeptide. In an embodiment, the caffeine-adsorbing material comprises a crosslinked polymer, wherein the crosslinked polymer is chosen from fibroin, elastin silk, collagen, keratin, and gelatin. Like crosslinked polysaccharides, many crosslinked polypeptides are hydrophilic and allow diffusion of aqueous solutions across the crosslinked polypeptides.

In certain embodiments, the caffeine-adsorbing material comprises a crosslinked polymer, wherein the crosslinked polymer is biocompatible. As described further herein, the caffeine-adsorbing materials are suitable for adsorbing and, thereby, removing caffeine from caffeine-containing solutions, such as beverages to be consumed by people. It is preferable to use biocompatible and otherwise non-toxic materials in the caffeine-adsorbing materials disclosed herein because such materials will not leach harmful chemicals into, for example, beverages to be consumed. In certain embodiments, the caffeine-adsorbent material is edible. Accordingly, if some of the caffeine-adsorbing material is consumed, in such instances the person who consumes it will not be harmed in so doing.

As noted above, the invention provides caffeine-adsorbing materials comprising crosslinked polymers. The crosslinked polymers are coupled, covalently or non-covalently by a crosslink. As used herein, a "crosslink" is a small region in a macromolecule from which at least four chains emanate, and formed by reactions involving sites or groups on existing macromolecules or interactions between existing macromolecules. In certain embodiments, the small region is an atom, or group of atoms, or a number of branch points connected by bonds, groups of atoms, or oligomeric chains. In certain embodiments, the crosslink is a covalent structure; however, the term is also used to describe sites of weaker chemical interactions, such as ionic bonds, hydrogen bonds, van der Waals interactions, portions of crystallites, and even physical interactions and entanglements.

Crosslinking advantageously provides structural rigidity that allows the crosslinked polymers to encapsulate or otherwise contain the caffeine adsorbents, while still allowing caffeine to diffuse across the polymer. As above, by containing the caffeine adsorbents within the crosslinked polymer, the caffeine-adsorbing material can remove caffeine from solutions.

In an embodiment, the caffeine-adsorbing material comprises a crosslinked polymer, wherein the crosslinked polymer comprises a polymer and a crosslink and wherein the crosslink is a multivalent ion. In certain embodiments, the multivalent ion is chosen from a divalent, trivalent, and tetravalent ion. In certain embodiments, the multivalent ion is a multivalent metal ion. In certain embodiments, the multivalent metal ion is chosen from a multivalent ion of calcium, magnesium, manganese, iron, copper, cobalt, nickel, zinc, barium, selenium, chromium, and molybdenum. Without being bound by theory, it is believed that multivalent ions coordinate with carbonyl and other moieties on two or more polymer chains or on the same chain, thereby linking the two or more carbonyl or other moieties. Accordingly, a multivalent metal ion can coordinate with a carbonyl on one polymer chain and a second carbonyl moiety on a second polymer chain, thereby crosslinking the polymer chains.

In an embodiment, the caffeine-adsorbing material comprises a crosslinked polymer and a caffeine adsorbent associated with the crosslinked polymer, wherein the crosslinked polymer comprises a polymer and a crosslink, and wherein the weight:weight ratio of the crosslink:polymer is greater than 1:100. As above, crosslinking provides structural rigidity to the caffeine-adsorbing materials. As described in the EXAMPLES below, in embodiments where, for example, the weight:weight ratio of the crosslink:polymer is greater than 1:100, such crosslinking provides sufficient structural rigidity to encapsulate the caffeine adsorbent while still allowing for diffusion of a caffeine-containing solution. For example, an embodiment, the crosslinked polymer is the reaction product of 0.01 g of $CaCl_2$ and 1 g of sodium alginate. In certain embodiments, the crosslinked polymer is the reaction product of a polymer and an excess of crosslink.

In an embodiment, the caffeine-adsorbing material comprises a crosslinked polymer and a caffeine adsorbent associated with the crosslinked polymer, wherein the caffeine-adsorbing material is insoluble or only partially soluble in an aqueous solution. In certain embodiments, the caffeine-adsorbing material is insoluble or only partially soluble in an aqueous solution having a temperature between about 60° C. and about 100° C. In certain embodiments, the caffeine-adsorbing material is insoluble or only partially soluble in a beverage, such as coffee. In such embodiments, the insoluble caffeine-absorbing material can be removed from the aqueous beverage once a caffeine has been removed therefrom, allowing a person to consume the beverage without also consuming the caffeine-adsorbing material.

In an embodiment, the caffeine-adsorbing material comprises a crosslinked polymer; and a caffeine adsorbent associated with the crosslinked polymer, wherein the crosslinked polymer is a crosslinked hydrogel. As used herein, a "hydrogel" is a hydrophilic, three-dimensional, swellable matrix that is produced by chemical and/or physical crosslinking of polymers. In certain embodiments, the hydrogels described herein include hydrated crosslinked hydrophilic polymers dispersed a liquid medium. In certain embodiments, the hydrogel is chosen from a hydrocolloid and a viscoelastic fluid. In certain embodiments, the hydrogels described herein include hydrated crosslinked hydrophilic polymers that are not dispersed in a liquid medium.

In an embodiment, the caffeine-adsorbing material comprises a crosslinked polymer and a caffeine adsorbent associated with the crosslinked polymer, wherein the caffeine-adsorbing material is dried or otherwise desiccated. Dried or otherwise desiccated caffeine-adsorbing materials are advantageous in certain embodiments because they are generally lighter and smaller than their hydrated counterparts, thereby reducing shipping costs and minimizing storage requirements. Further, as shown in the EXAMPLES below, such dried or otherwise desiccated caffeine-adsorbing materials can be hydrated, for example in a caffeine-containing solution, and are suitable to adsorb caffeine.

Figure 3:
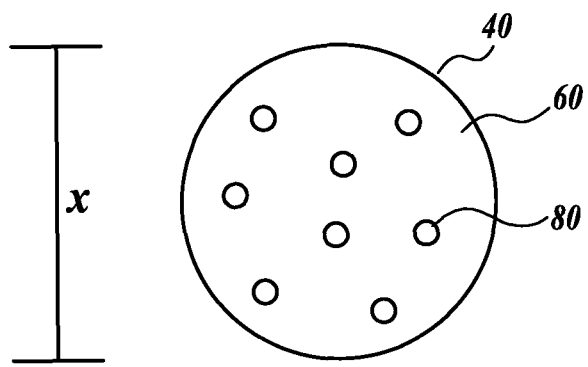
FIG. 3 is side view of a representative embodiment of a caffeine-adsorbing material in accordance with an aspect of the disclosure.
Figure 4:
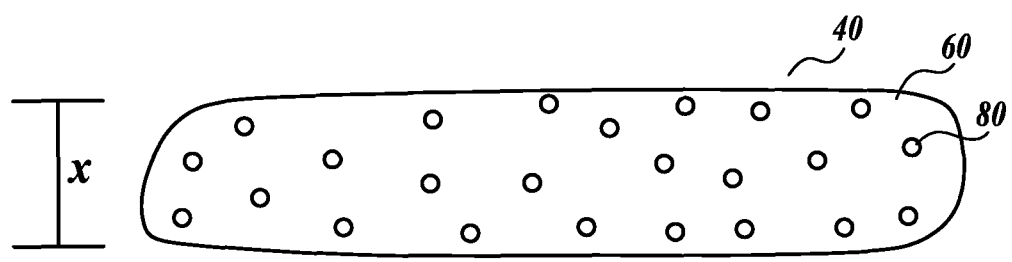
FIG. 4 is side view of a representative embodiment of a caffeine-adsorbing material in accordance with an aspect of the disclosure.

In certain embodiments, the caffeine-adsorbing material has a smallest diameter or feature size of between about 100 nm and about 10 mm. As shown in FIG. 3 and FIG. 4, the caffeine-adsorbing material 40 includes a crosslinked polymer 60 and a caffeine adsorbent 80 associated with the crosslinked polymer 60. Further, the caffeine-adsorbing material 40 has a smallest diameter or feature size X.

By having a relatively small diameter or feature size, the caffeine-adsorbing materials allow diffusion of a caffeine-containing solution over its surface, thereby enhancing contact area between the caffeine-adsorbing material and the caffeine-containing solution over a bulk material with larger features. Accordingly, in an embodiment, the caffeine-adsorbing material is in the shape of a bead, as depicted in FIG. 3. In certain such embodiments, the caffeine-adsorbing bead is spherically- or generally spherically-shaped having a smallest diameter or feature size X between about 100 nm and about 10 mm. In another embodiment, the caffeine-adsorbing material is in the shape of a string or fiber, as depicted in FIG. 4. In certain such embodiments, the string has and an elongate structure and smallest diameter or feature X between about 100 nm and about 10 mm. In an embodiment, the string has a smallest diameter or feature between about 100 nm and about 10 mm and has other features that are larger than 10 mm. For example, in an embodiment, the string has a smallest diameter or feature between about 100 nm and about 10 mm and a length between about 1 mm to about 200 mm. As described further herein, both beads and strings are suitable for manufacturing through flow-focusing methods and, accordingly, can be made with high-throughput methods.

In an embodiment, the caffeine-adsorbing material has an ovoid shape. In an embodiment, the ovoid caffeine-adsorbent has a smallest diameter or feature size between about 100 nm and about 10 mm.

In an embodiment, the caffeine-adsorbing material has a plate shape. In an embodiment, the plate-shaped caffeine-adsorbent has a smallest diameter or feature size between about 100 nm and about 10 mm.

The caffeine-adsorbing materials comprise a crosslinked polymer and a caffeine adsorbent associated with the crosslinked polymer. In an embodiment, the caffeine-adsorbent is covalently bound to the crosslinked polymer. In an embodiment, the caffeine-adsorbent is non-covalently coupled to the crosslinked polymer through, for example, electrostatic forces, hydrogen bonds, van der Waals forces, and other non-covalent bonds. In an embodiment, the caffeine adsorbent is physically contained or otherwise disposed within the crosslinked polymer.

In certain embodiments, the caffeine-adsorbing material comprises a crosslinked polymer; and a caffeine adsorbent associated with the crosslinked polymer, wherein the caffeine adsorbent is a clay particle. As used herein, a "clay particle" is a fine-grained rock or soil material that includes one or more clay minerals. As used herein, "clay minerals" refer to minerals of the silicate mineral class. In certain embodiments, at least 50% of the material possesses a Stokes diameter of <2 µm. In certain embodiments, the clay particle comprises a material chosen from laponite, montmorillonite, beidellite, nontronite, hectorite, saponite, sauconite, sepiolite, and combinations thereof. In certain embodiments, the clay particle comprises bentonite. In certain embodiments, cations attracted to and/or coordinated with the mineral surface are replaced by other cations, thereby making them homo-ionic. Clay minerals are also non-toxic, compostable, do not generally react with other compounds, and are inexpensive. As shown in the EXAMPLES below, clay particles are effective at adsorbing caffeine from a caffeine-containing solution, thereby removing it from the caffeine-containing solution when they are contained within a crosslinked polymer.

In certain embodiments, the caffeine-adsorbing material comprises a crosslinked polymer; and a caffeine adsorbent associated with the crosslinked polymer, wherein the caffeine adsorbent is activated carbon. As used herein, "activated carbon" refers to a form of carbon compound that has small, low-volume pores. It is believed that such small, low-volume pores enable activated carbon it to increase the surface area available for adsorption or chemical reactions. In certain embodiments, the activated carbon has a surface area between about 500 and about 1,500 square meters per gram. In certain embodiments, activated carbon includes pores chosen from micro-pores, meso-pores, and macropores. As shown in the EXAMPLES below, activated carbon is effective at adsorbing caffeine from a caffeine-containing solution, thereby removing it from the caffeine-containing solution when it is contained within a crosslinked polymer.

In certain embodiments, the activated carbon comprises a material that occupies a site in the activated carbon that would adsorb sugars from a solution in the absence of the material. In certain embodiments, the material is chosen from a sugar and an acid. In certain embodiments, the sugar is sucrose. In certain embodiments, the acid is chosen from an inorganic acid and an organic acid. In certain embodiments, the acid is formic acid. Activated carbon loaded with a material that occupies a site in the activated carbon that would adsorb sugars from a solution in its absence provides greater selectivity in adsorbing caffeine from a caffeine-containing solution.

In certain embodiments, the caffeine-adsorbing material comprises a crosslinked polymer and a caffeine adsorbent associated with the crosslinked polymer, wherein the caffeine adsorbent is a zeolite. As used herein, a "zeolite" refers to an aluminosilicate mineral that is porous. In certain embodiments, the pore size is between about a nanometer and about an angstrom. In certain embodiments, zeolites have relatively open, three-dimensional crystal structures built from aluminum, oxygen, and silicon, with alkali or alkaline-Earth metals. In certain embodiments, such metals include sodium, potassium, and magnesium. As shown in the EXAMPLES below, zeolites are effective at adsorbing caffeine from a caffeine-containing solution, thereby removing it from the caffeine-containing solution when they are contained within a crosslinked polymer.

In certain embodiments, the zeolite is a crystalline zeolite Y. In certain embodiments, the zeolite is a zeolitic aluminosilicate having a $SiO_2:Al_2O_3$ molar ratio of from about 4.5 to about 35. In certain embodiments, the zeolite is a crystalline zeolite Y. In certain embodiments, the zeolite is a zeolitic aluminosilicate having a $SiO_2:Al_2O_3$ molar ratio of from about 4.5 to about 9. In certain embodiments, the zeolite has an essential X-ray powder diffraction pattern of zeolite Y. Description of an exemplary suitable zeolite may be found in, for example, U.S. Pat. No. 4,331,694 to Izod, the contents of which concerning zeolites is incorporated herein by reference in its entirety. In certain embodiments, the zeolite has an ion-exchange capacity of not greater than 0.070. In certain embodiments, the zeolite has a unit cell dimension, $a_o$, of from about 24.20 to about 24.45 Angstroms. In certain embodiments, the zeolite has a surface area of at least 350 $m^2$/gram (B-E-T). In certain embodiments, the zeolite has a sorptive capacity for water vapor at 25° C. In certain embodiments, the zeolite has a p/po value of 0.10 of less than 5.00 weight percent. In certain embodiments, the zeolite has and a Residual Butanol Test value of no more than 0.40 weight percent.

In certain embodiments, the caffeine-adsorbing material comprises a crosslinked polymer and a caffeine adsorbent associated with the crosslinked polymer, wherein the caffeine adsorbent is an ion-exchange resin. As used herein, "ion-exchange resins" refer to any organic compounds that include positively or negatively charged sites that are able to attract ions of opposite charge from a surrounding solution. In certain embodiments, ion-exchange resins include porous solid materials. In certain embodiments, when ion-exchange resins are in contact with a solution, the ion-exchange resin absorbs at least a portion of the solution and swells. Further, in certain embodiments, the ion-exchange resins adsorb components from the solution, particularly those with charges opposite from the ion-exchange resin itself. In certain embodiments, the ion-exchange resin is modified or otherwise tuned to have a charge configured to attract and adsorb specifically caffeine molecules.

In certain embodiments, the caffeine-adsorbing material comprises: a crosslinked polymer and a caffeine adsorbent associated with the crosslinked polymer, wherein the caffeine adsorbent is a molecular imprint polymer. In certain embodiments, the molecular imprint polymer is a caffeine imprint polymer suitable for food application and which selectively removes caffeine from a caffeine-containing solution. In an embodiment, the molecular imprint polymer is the caffeine imprint polymer described in European Patent Application No. EP19950203394, filed Dec. 7, 1995, which is hereby incorporated by reference in its entirety.

In certain embodiments, the caffeine-adsorbing material comprises a crosslinked polymer and a caffeine adsorbent associated with the crosslinked polymer, wherein the ratio of crosslinked polymer to caffeine adsorbent is between about 50:1 and about 1:50. In certain embodiments, the caffeine-adsorbing material comprises a crosslinked polymer; and a caffeine adsorbent associated with the crosslinked polymer, wherein the ratio of crosslinked polymer to caffeine adsorbent is between about 6:1 and about 1:3. In certain embodiments, the caffeine-adsorbing material comprises a crosslinked polymer and a caffeine adsorbent associated with the crosslinked polymer, wherein the ratio of crosslinked polymer to caffeine adsorbent is between about 1:1 and about 1:10. In certain embodiments, the ratio of the crosslinked polymer to caffeine adsorbent is between about 1:1 and about 1:4.

As described further herein, the caffeine-adsorbing materials are useful in adsorbing caffeine from caffeine-containing solutions. Many caffeine-containing solutions, such as caffeinated beverages, are served and consumed hot or warm. Accordingly, in certain embodiments, the caffeine-adsorbing materials described herein are thermostable at a range of temperatures at which caffeinated beverages are served and consumed. As used herein, "thermostable" refers to a compound or material that does not dissolve, break apart, or otherwise undergo irreversible change in its chemical or physical structure at a high relative temperature. In certain embodiments, the caffeine-adsorbent material, comprising: a crosslinked polymer; and a caffeine adsorbent associated with the crosslinked polymer, is thermostable at temperatures at least about 150° C. In certain embodiments, the caffeine-adsorbing material is thermostable at temperatures at least about 100° C.

In certain embodiments, the caffeine-adsorbing material is pH-stable at a range of pH levels. As used herein, "pH-stable" refers to a compound or material that does not dissolve, break apart, or otherwise undergo irreversible change to its chemical or physical structure at a high or low relative pH. Caffeine-containing solutions, such as caffeinated beverages, often have high or low relative pH levels. For example, coffee typically has a lower relative pH, between about 3 and about 6. In certain embodiments, the caffeine-adsorbing material, comprising a crosslinked polymer; and a caffeine adsorbent associated with the crosslinked polymer, is pH-stable at between about pH 2 and about pH 10. In certain embodiments, the caffeine-adsorbing material is pH-stable between about pH 3 and about pH 6. Such pH-stability is advantageous because the caffeine-adsorbing material does not dissolve or break apart in an acidic or basic solution, thereby retaining any adsorbed caffeine within the caffeine-adsorbing material. With the caffeine retained in the caffeine-adsorbing material, the caffeine-adsorbing material can be removed from a solution, such a beverage, thereby removing the caffeine from the solution.

In an embodiment, the caffeine-adsorbing material consists of a crosslinked polymer and a caffeine adsorbent associated with the crosslinked polymer.

In an embodiment, the caffeine-adsorbing material consists essentially of a crosslinked polymer and a caffeine adsorbent associated with the crosslinked polymer.

Caffeine-Adsorbing Systems

In a second aspect, the invention provides caffeine-adsorbing systems.

In an embodiment, the caffeine-adsorbing system includes a porous container; and a caffeine-adsorbing material disposed within the porous container. In certain embodiments, the caffeine-adsorbing material is according to any caffeine-adsorbing material described herein.

In an embodiment, the caffeine-adsorbing system includes a porous container; and a caffeine-adsorbing material disposed within the porous container, wherein the porous container includes pores with a smallest dimension or feature that is smaller than the smallest dimension or feature of the caffeine-adsorbing material. Turning to FIG. 1 a caffeine-adsorbing system 10 is illustrated. As illustrated in FIG. 1, the porous container 20 includes a number of pores 24 and a caffeine-adsorbing material 40 disposed within the porous container 20. The caffeine-adsorbing material 40 includes a crosslinked polymer 60 and caffeine adsorbent 80 associated with the crosslinked polymer 60.

Such caffeine-adsorbing systems 10 advantageously keep the caffeine-adsorbing material 40 disposed within the porous container 20, thereby separating the caffeine-adsorbing material, and any adsorbed caffeine, from a solution, such as a beverage. In certain embodiments, the size of pores 24 of the porous container 20 is smaller than about 100 nm to about 10 mm, and wherein the smallest feature of the caffeine-adsorbing material is between about 100 nm to about 10 mm.

Figure 2:
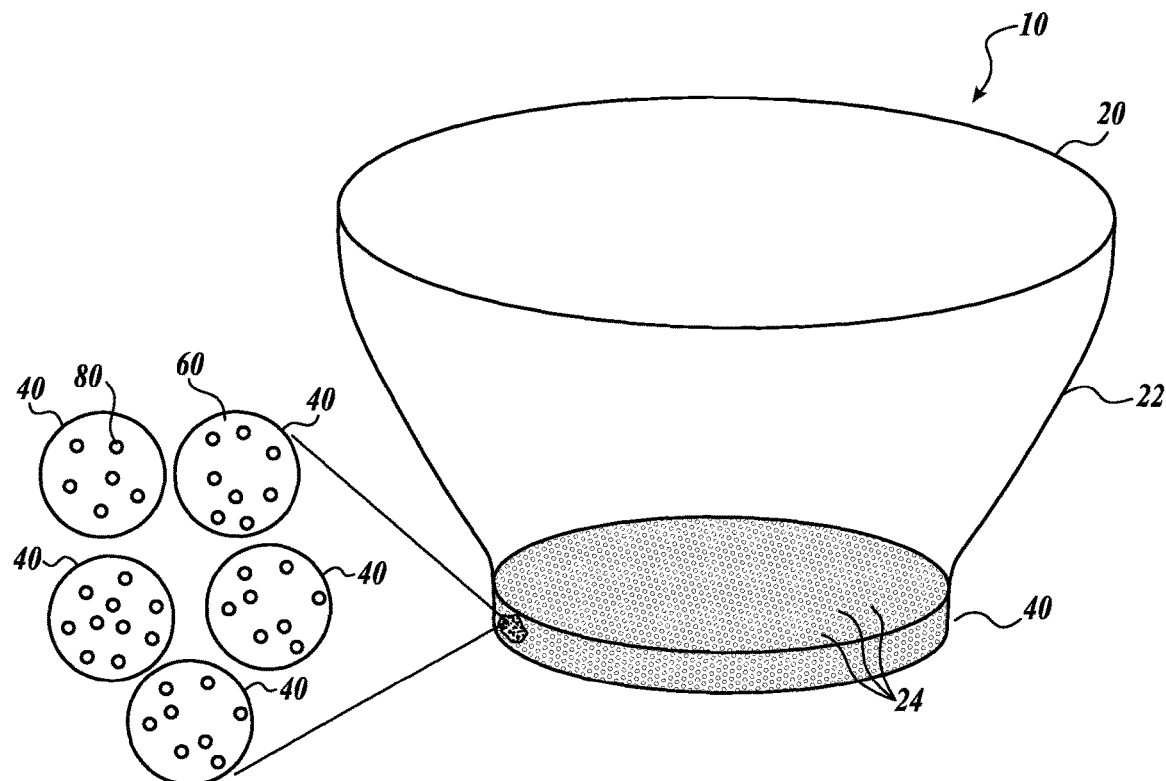
FIG. 2 is perspective view of a representative embodiment of a caffeine-adsorbing system in accordance with an aspect of the disclosure.

The porous container can be any container having pores configured to allow fluid flow. In certain embodiments, the porous container includes a woven material, such as a woven silk or cloth bag or sachet. In certain embodiments, the porous container includes a non-woven porous material, such a paper tea bag or sachet (as illustrated in FIG. 1). In certain embodiments, the porous container includes a non-woven porous container. In certain embodiments, the non-woven porous container comprises. In certain embodiments, the porous container includes. In certain embodiments, the porous container is metal tea ball having a number of perforations. In certain embodiments, the porous container is a portion of a French press coffee press, in which the caffeine-adsorbing material is contained within the bottom, filtered portion of the French press coffee press. In certain embodiments, the porous container is configured to fit in a percolator or other coffee-making machine and filter the coffee grounds from coffee solution. As illustrated in FIG. 2, the caffeine-adsorbing system 10 includes a porous container 20 in the shape of a coffee filter suitable for preparing and filtering coffee. The porous container 20 includes a conical wall 22 for holding coffee grounds and caffeine-adsorbing material 40 disposed within the porous container 20. The caffeine-adsorbing material 40 includes a crosslinked polymer 60 and caffeine adsorbent 80 associated with the crosslinked polymer 60.

In certain embodiments, the porous container includes a handle for retrieving the caffeine-adsorbing system from a solution. In certain embodiments, the handle is a string.

In certain embodiments, the porous container is configured to contain an amount of caffeine-adsorbing material suitable to adsorb all or a large portion of the caffeine in, for example, an 8 ounce, 12 ounce, 16 ounce, 20 ounce, or larger cup of coffee. In certain embodiments, the porous container is configured to contain an amount of caffeine-adsorbing material suitable to adsorb all or a large portion of the caffeine in, for example, a pot of coffee. In certain embodiments, the porous container is configured to contain an amount of caffeine-adsorbing material suitable to adsorb all or a large portion of the caffeine in, for example, a samovar of coffee. In an embodiment, the porous container is configured to contain a solution used in industrially brewing a large volume of coffee suitable for bottling in smaller containers.

Methods of Removing Caffeine from a Solution

In another aspect, the invention provides a method of removing caffeine from a solution.

In an embodiment, the method generally includes contacting the solution with a caffeine-adsorbing material for a time and under conditions sufficient to adsorb caffeine, thereby removing caffeine from the solution. In certain embodiments, the caffeine-adsorbing material is according to any caffeine-adsorbing material described herein.

In certain embodiments, the method further comprises removing the caffeine-adsorbing material from the solution once all or a portion of the caffeine has been adsorbed onto the caffeine-adsorbing material. In so doing, the caffeine is removed from the solution entirely. Removal can include removing a caffeine-adsorbing system comprising a caffeine-adsorbing material, as described herein, from the solution.

The methods of the present aspect include contacting the solution with a caffeine-adsorbing material for a time and under conditions sufficient to adsorb caffeine. Conditions include any condition sufficient to adsorb caffeine onto caffeine-adsorbing material. In view of the teachings of the disclosure and the knowledge of those of skill in the art, such conditions will be apparent to those of skill in the art. Condition parameters include solution temperature and concentration of the caffeine-containing solution, concentration of the caffeine-adsorbing material, and the like. Likewise, it will be understood by those skilled in the art, in view of the teachings of the present disclosure, how long to contact the solution with the caffeine-adsorbing materials.

As disclosed herein, caffeine adsorption can be measured with, for example, UV-vis spectroscopy and HPLC.

In certain embodiments, the method comprises contacting the solution with a caffeine-adsorbing material for a time and under conditions sufficient to adsorb caffeine, thereby removing caffeine from the solution, wherein the time is between about 1 minute and about 60 minutes. In an embodiment, the time is between about 2 minutes and about 30 minutes. In an embodiment, the time is between about 3 minutes and about 10 minutes.

In an embodiment, the method comprises contacting the solution with a caffeine-adsorbing material for a time and under conditions sufficient to adsorb caffeine, thereby removing caffeine from the solution, wherein the solution is a beverage. In an embodiment, the beverage is coffee. In an embodiment, the beverage is chosen from coffee, black tea, green tea, oolong tea, white tea, pu-erh tea, dark tea, herbal tea, floral tea, chai, macha, energy drink, alcohol-based drink, mate, soda, and cocoa.

In certain embodiments, the solution is between about 60° C. and about 110° C. when in contact with the caffeine-adsorbing material. In certain embodiments, the solution is between about 90° C. and about 100° C. when in contact with the caffeine-adsorbing material, such as when a beverage like coffee or tea is brewing. In certain embodiments, the solution is between about 20° C. and about 40° C. when in contact with the caffeine-adsorbing material, such as when brewing cold water extract or cold press coffee.

In an embodiment, the solution has a volume between about 8 ounces and about 20 ounces. In an embodiment, the solution has a volume of, for example, about 8 ounces, about 12 ounces, about 16 ounces, about 20 ounces, or more. In an embodiment, the solution is a beverage configured to be consumed by a single person. In an embodiment, the solution is a pot of coffee. In an embodiment, the solution is a samovar of coffee. In an embodiment, the solution is a large caffeinated solution, for example, one used in industrially brewing a large volume of coffee suitable for bottling in smaller containers.

Decaffeination System

In another aspect, the present invention provides decaffeination system comprising a caffeine-containing solid and a caffeine-adsorbing material.

In an embodiment, the caffeine-containing material includes coffee grounds. In an embodiment, the caffeine-containing material includes tea leaves. In an embodiment, the caffeine-containing material includes coffee crystals. In an embodiment, the caffeine-containing material includes coffee powder. In an embodiment, the caffeine-containing material includes tea powder.

In an embodiment, the caffeine-adsorbing material is any caffeine-adsorbing material disclosed herein.

Methods of Making Caffeine-Adsorbing Material

In another aspect, the present invention provides methods of making caffeine-adsorbing materials. In an embodiment, the method of this aspect includes contacting a solution or suspension comprising a caffeine adsorbent and a polymer with a crosslink configured to crosslink the polymer.

In an embodiment, the caffeine adsorbent is a clay particle. In an embodiment, the clay is treated to create a clay dispersion. In an embodiment, the clay dispersion is treated with ultrasound and/or a mixer to provide a clay dispersion comprising clay particles. In an embodiment, the clay dispersion is fractionated to remove contaminants, such as quartz. In an embodiment, the clay is treated with a concentrated salt solution to make a face of the clay particle homo-ionic.

Figure 6:
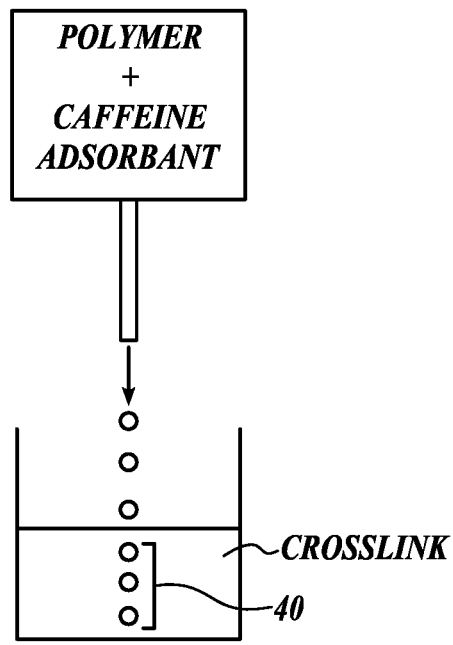
FIG. 6 is a side view in partial cross section of a system useful in making a representative embodiment of a caffeine-adsorbing material in accordance with an aspect of the disclosure.

In an embodiment, the method of making a caffeine-adsorbing material includes dropwise addition. As illustrated in FIG. 6, in an embodiment, dropwise addition includes introducing drops of a solution or suspension comprising a caffeine adsorbent and a polymer into a solution comprising a crosslink configured to crosslink the polymer. When the drops comprising the caffeine adsorbent and the polymer contact the solution comprising the crosslink the polymer becomes a crosslinked polymer, thereby forming beads of a caffeine-adsorbing material comprising a crosslinked polymer and a caffeine adsorbent associated with the crosslinked polymer.

In an embodiment, drops of the solution or suspension comprising a caffeine adsorbent and a polymer are generated with a syringe or other device with an aperture through which the solution or suspension may be ejected in the form of drops. As shown in the EXAMPLES below, a smaller needle gauge or aperture provides smaller caffeine-adsorbing material. In an embodiment, the needle is a 6-34 gauge needle.

To make plate-shaped caffeine-adsorbing materials, an external force, such as a roller, is used to flatten the beads. To make ovoid-shaped caffeine-adsorbing materials the viscosity of the polymer/caffeine adsorbent solution is at a relatively high level. As it exits the needle and enters the crosslink solution its shape is maintained, thereby providing an ovoid-shaped caffeine-adsorbing material.

In an embodiment, beads are introduced into a high-shear mixer, which breaks up the beads providing smaller beads. As described further herein smaller beads provide more surface area, which typically leads to faster caffeine-adsorption kinetics.

In an embodiment, the solution or suspension comprises alginic acid and bentonite clay particles and the crosslink is a divalent calcium ion.

Flow-focusing is a method that uses hydrodynamic characteristics to produce drops or bubbles. It can be used to produce various sizes of drops or bubbles. The basic operation includes surrounding a dispersed phase (a focused or core fluid) with a continuous phase fluid (a focusing or sheath fluid), thereby giving rise to droplets in the vicinity of an orifice through which both fluids are extruded.

A flow-focusing device includes a pressure chamber pressurized with a continuous focusing fluid supply. Inside, one or more focused fluids are injected through a capillary feed tube whose extremity opens up in front of a small orifice linking the pressure chamber with the exterior. The focusing fluid stream molds the fluid meniscus into a cusp giving rise to a steady micro or nano-jet exiting the chamber through the orifice; the jet size is much smaller than the exit orifice, thus precluding any contact (which may lead to unwanted deposition or reaction). Capillary instability breaks up the steady jet into homogeneous droplets or bubbles.

Figure 5:
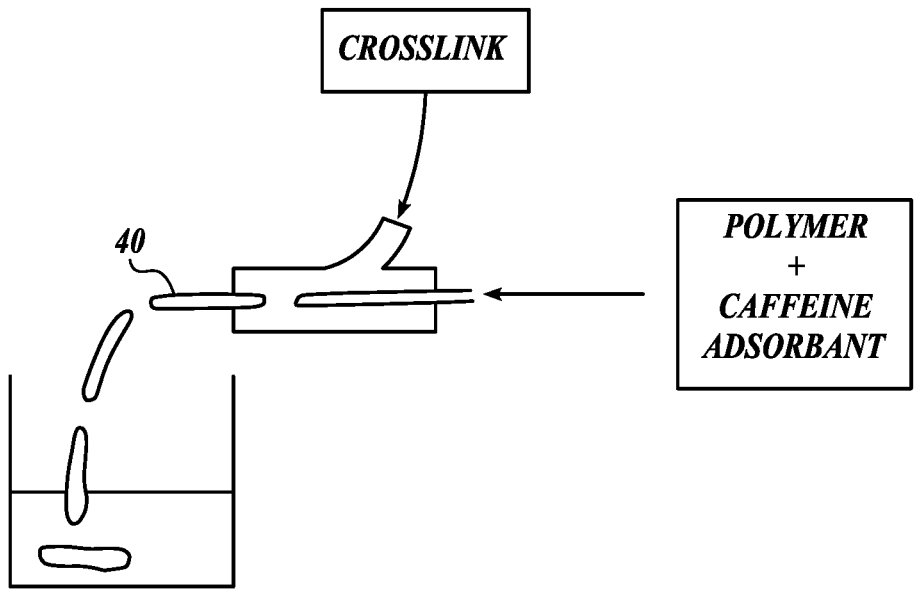
FIG. 5 is a side view in partial cross section of a system useful in making a representative embodiment of a caffeine-adsorbing material in accordance with an aspect of the disclosure.

Disclosed herein is a concentric flow system suitable for producing beads and strings of various sizes. In use it can produce small to large particles having shapes including, for example, spheres, elongated spheres, ellipses, and strings by controlling the relative flow rate of the solutions, as described further herein. As illustrated in FIG. 5, a focused fluid including a polymer and a caffeine adsorbent are injected through a capillary feed. A focusing fluid including a crosslink coaxially surrounds the focused fluid. In operation, the polymer is crosslinked by the crosslink thereby forming strings of a caffeine-adsorbing material comprising a crosslinked polymer and a caffeine adsorbent associated with the crosslinked polymer. As the flow rate of the focusing fluid is increased relative to the focused fluid flow rate, the resulting strings are shorter.

The following examples are provided for the purpose of illustrating, not limiting, the invention.

EXAMPLES

Example 1

The Preparation of Representative Caffeine-Adsorbing Materials Including Clay Minerals in Alginic Acid Beads by Dropwise Addition Bentonite, a clay mineral rich in montmorillonite, was mixed with water to form a 0.1-10% w/w dispersion. The bentonite dispersion was further treated with ultrasound and exfoliated. This treatment breaks up aggregates and allows for more complete dispersion of the clay.

The clay is fractionated to remove mineral contaminants, such as quartz. The clay is centrifuged, and the supernatant is removed.

The face of the clay particles are made homo-ionic by adding a highly concentrated solution of calcium chloride, potassium chloride, or any other salt with the desired cation, preferably one with low hydration energy. Next the clay is centrifuged and the supernatant is extracted, allowing the process to be repeated with a fresh batch of cation solution. Following this step, the clay is washed several times using deionized water until there is no evidence of charged particles in the clay suspension. This treatment is useful in enhancing the ability of the clay to be a good adsorbent for caffeine.

It is contemplated that the clay mineral may also be acid-treated, with inorganic acids such as hydrochloric acid or phosphoric acid, for example, to further increase surface area and/or selectivity and/or ease of use.

Alginic acid is dissolved in deionized water, ranging from 0.5-4% w/v and stirred until a homogenous suspension is obtained free of air bubbles.

The clay slurry is mixed thoroughly with the alginic acid solution. Combinations suitable for preventing clay from leaching may range from 6:1 to 1:3 clay:alginic acid by mass.

The composite mixture is introduced into a solution of 0.1-5 M CaCl2 solution in a dropwise manner, thereby forming beads. The beads formed are continuously stirred to avoid aggregation of alginate beads and allowed to harden for 0.5-2 hours. A suitable amount of $CaCl_2$ solution is 2-3 times the volume of clay/alginic acid to be added.

The beads can be formed with a 6-34 gauge needle and syringe. Smaller particles sizes may be formed, for example, by dropping larger beads into a high-shear mixer; this treatment is useful in increasing surface area and therefore adsorption kinetics.

The beads formed are rinsed several times with water to eliminate excess calcium ions in the beads. The beads are dried thoroughly, with, for example, paper towels, heating lamp, food dehydrator, or other similar methods. In addition, it may be possible for the beads to be frozen and freeze-dried before use. This reduces their size and weight and allows more to be packed into a filter device.

Example 2

The Preparation of Representative Caffeine-Adsorbing Materials Including Activated Carbon in Alginic Acid Beads by Dropwise Addition Activated carbon is pre-loaded with sugar and formic acid in water, or similar compounds, to achieve greater selectivity for caffeine. The sucrose/acid occupies sites in the carbon that would normally absorb sugars from the coffee extract.

Alginic acid is dissolved in deionized water, ranging from 0.5-4% w/v and stirred until a homogenous suspension is obtained free of air bubbles. Preloaded carbon is mixed thoroughly with the alginic acid solution. Combinations suitable for preventing carbon from leaching may range from 1:1 to 1:4 activated carbon:alginic acid by mass.

The composite mixture is introduced into a solution of 0.1-5 M $CaCl_2$ solution in a drop-wise manner. The beads formed are continuously stirred to avoid aggregation of alginate beads and allowed to harden for 0.5-2 hours. The suitable amount of $CaCl_2$ solution is 2-3 times the volume of carbon/alginic acid to be added.

The beads can be formed with a 6-34 gauge needle and syringe. Smaller particles sizes may be formed, for example by dropping larger beads into a high-shear mixer; this treatment is useful in increasing surface area and therefore adsorption kinetics.

The beads formed are rinsed several times with water to eliminate excess calcium ions in the beads. The beads are dried thoroughly, with, for example, paper towels, heating lamp, food dehydrator, or other similar methods. In addition, it may be possible for the beads to be frozen and freeze dried before use. This reduces their size and allows more to be packed into a filter device.

Example 3

The Preparation of Representative Caffeine-Adsorbing Materials Through Flow-Focusing Methods 5 wt % bentonite clay is mixed with 95 wt % water. The suspension is sonicated for 20 minutes. 1.5 wt % alginate is mixed with 98.5 wt % water. After both the bentonite and alginate are dispersed into water, the bentonite suspension and alginate solution are mixed together (A/B solution). A 0.2 M $CaCl_2$ solution is prepared. The A/B solution is placed into a surge tank. A surge tank is useful to even out any pulse input from a peristaltic pump. When the surge tank is almost full and right before the A/B solution comes out from an 18 gauge needle, another power supply and controller are used to flow the $CaCl_2$ solution into concentric flow part. When the A/B solution comes out from the needle and contacts the $CaCl_2$ solution, the alginate crosslinks and forms hydrogel structure, containing or trapping the suspended bentonite. Within the concentric flow part, the $CaCl_2$ solution is flowing at a much faster rate than the A/B solution, therefore, the shear stress of the $CaCl_2$ solution will break the strip of A/B solution into strings or, depending on the relative flow rates, beads. By controlling the relative flow rate, the length of the string can be controlled; the bigger the difference in flow rate, the shorter the string will be.

Example 4

UV-Vis Measurement of Representative Caffeine Adsorption by Caffeine-Adsorbing Materials A 0.5 mg/mL aqueous caffeine solution was prepared. A representative caffeine-adsorbing material is placed in the caffeine solution and the solution is stirred. Aliquots are removed at particular time points. The aliquots are diluted 1:100. The diluted aliquots are measured on a UV-vis spectrometer and the absorbance at 273 nm is recorded.

Example 5

HPLC Measurement of Caffeine Adsorption by Caffeine-Adsorbing Materials

Caffeine-adsorbing materials are prepared, as above. Their dried weight is recorded.

Coffee or other caffeine-containing solution is prepared. The caffeine-adsorbing material is placed in the coffee and stirred. Aliquots are removed at particular time points and diluted 1:10. The diluted samples are filtered with a 0.45 micron PTFE membrane luer lock filter device. The diluted samples are placed in HPLC vials and run on the HPLC machine.

The samples were compared to solutions of known caffeine concentrations (0.2, 0.4, 0.6, 0.8, & 1.0 mg/mL).

The column conditions were as follows:
Column: Agilent ZORBAX Eclipse Plus C18, 4.6 mm×150 mm, (5 μm)
Detector: UV at 273 nm
Mobile Phase: water/methanol (25/75% by volume)
Flow Rate: 0.70 mL/min
Temperature: 45° C.
Injection Volume: 10 uL
Runtime: 15 minutes Example 6

Caffeine Adsorption by Various Caffeine Adsorbents

The data show the caffeine adsorption efficiencies for using various materials as encapsulated absorbents to remove caffeine. The tested materials are bentonite, carbon, and laponite, with particle sizes varying from nanometers to micrometers. As shown in TABLE 1-1, with 15.0 wt % of material to solution ratio, the bentonite strings are able to remove 100 percent of caffeine from 1.57 miligram per milliliter of caffeinated solution after 10 minutes. As shown in TABLE 1-2, with 24.1 wt % of material to solution ratio, the carbon beads are able to remove 98.5 percent of caffeine from 0.311 milligram per milliliter of caffeinated solution after 30 minutes. As shown in TABLE 1-3, with 19.6 wt % of material to solution ratio, the laponite beads are able to remove 74.2 percent of caffeine from 0.625 milligram per milliliter of caffeinated solution after 20 minutes.

TABLE 1-1

Alginate:Carbon (1:3) bead; 24.1 wt % material to soln

| Time (min) | % Caffeine Reduction | Concentration (mg/mL) |
| --- | --- | --- |
| 0 | 0 | 1.573673505 |
| 2 | 70.51838456 | 0.463944371 |
| 10 | 94.31222498 | 0.089507009 |
| 30 | 98.48632284 | 0.023820336 |

TABLE 1-2

Alginate:Laponite (1:3); bead; 19.6 wt % material to soln

| Time (min) | % Caffeine Reduction | Concentration (mg/mL) |
| --- | --- | --- |
| 0 | 0 | 0.311201665 |
| 2 | 60.43998456 | 0.123111427 |
| 3 | 63.69760245 | 0.112973666 |
| 5 | 67.5550616 | 0.100969189 |
| 10 | 71.65023959 | 0.088224926 |
| 20 | 74.17417312 | 0.080370403 |

TABLE 1-3

Alginate:Bentonite (1:12); string; 15 wt % material to soln

| Time (min) | % Caffeine Reduction | Concentration (mg/mL) |
| --- | --- | --- |
| 0 | 0 | 0.625462472 |
| 1 | 40.74502166 | 0.370617652 |
| 2 | 76.72135161 | 0.14559921 |
| 3 | 90.15360582 | 0.0615855 |
| 5 | 97.75598117 | 0.014035496 |
| 10 | 100.4352222 | 0.002722152 |

From this data, caffeine absorbents associated with cross-linked polymers demonstrate caffeine adsorption efficiencies of more than 70% in only a few minutes. These results demonstrate that the hydrogel structure is highly permeable to caffeinated solution and allows the absorbent to adsorb caffeine molecules as the caffeinated solution moves in and out of the structure.

Example 7

The Caffeine Adsorption by Dried Caffeine-Adsorbing Materials

Caffeine-adsorbing materials including 2:1 alginate:bentonite and 1:3 alginate:bentonite were prepared as above. The 2:1 and 3:1 alginate:bentonite caffeine-adsorbing materials were then freeze dried.

Additionally, caffeine-adsorbing materials including 1:1 alginate:bentonite and 1:3 alginate:bentonite were prepared as above. The 1:1 and 1:3 alginate:bentonite caffeine-adsorbing materials were air-dried.

The freeze-dried caffeine-adsorbing materials and the air-dried caffeine-adsorbing materials were reconstituted in a caffeine solution.

The data, summarized in TABLES 2-1 through 2-4, shows that the dried hydrogel absorbent-encapsulated material would adsorb caffeine. With freeze-dried 2:1 alginate:bentonite beads, the material is able to remove 38.8 percent of caffeine from 0.132 milligram per milliliter of caffeinated solution after 5 minutes using 1 wt % of material to solution ratio. With air-dried 1:1 alginate:bentonite bentonite beads, the material is able to remove 26.1 percent of caffeine from 0.132 milligram per milliliter of caffeinated solution after 5 minutes using 1 weight percent of material to solution ratio. The data show that the freeze-dried samples tend to have a higher caffeine adsorption efficiency compared to the air-dried samples.

TABLE 2-1

Alginate:Bentonite (1:1); air-dried; bead; 1 wt % material to soln

| Time (min) | % Caffeine Reduction | Concentration (mg/mL) |
| --- | --- | --- |
| 0 | 0 | 0.13217945 |
| 2 | 13.88041812 | 0.11383239 |
| 5 | 26.06656887 | 0.097724803 |

TABLE 2-2

Alginate:Bentonite (3:1); freeze-dried; bead; 1 wt % material to soln

| Time (min) | % Caffeine Reduction | Concentration (mg/mL) |
| --- | --- | --- |
| 0 | 0 | 0.13217945 |
| 2 | 23.924395 | 0.100556317 |
| 5 | 38.78861789 | 0.080908868 |

TABLE 2-3

Alginate:Bentonite (1:3); bead; air-dried; 1.8 wt % material to soln

| Time (min) | % Caffeine Reduction | Concentration (mg/mL) |
| --- | --- | --- |
| 0 | 0 | 1.573673505 |
| 2 | 10.76275072 | 1.404302949 |
| 10 | 17.41718954 | 1.299583808 |
| 30 | 20.55271571 | 1.250240864 |

TABLE 2-4

| Alginate:Bentonite (1:3); bead; freeze-dried; 1.8 wt % material to soln | | |
|---|---|---|
| Time (min) | % Caffeine Reduction | Concentration (mg/mL) |
| 0 | 0 | 1.573673505 |
| 2 | 13.3766975 | 1.363167961 |
| 10 | 16.48852653 | 1.314197932 |
| 30 | 31.58816529 | 1.076578917 |

Example 8

The Effect of Bead Size of Representative Caffeine-Adsorbing Materials on Caffeine Adsorption Caffeine-adsorbing materials in the shape of beads were prepared using drop-wise addition, as described further herein. Three compositions of the same material were made into three different sizes, with bead diameter of 2.9±0.2 mm, 3.1±0.3 mm, and 5.0±0.7 mm. At the same composition, 0.85 percent alginate, 3.4 percent bentonite, and 95.75 percent water, and same conditions were tested using 50 weight percent of material to caffeinated solution ratio. As summarized in TABLES 3-1 through 3-3, the data show that the bigger the beads are, the less efficient the material is at absorbing caffeine. The 2.9±0.2 mm beads are able to remove 91.9 percent of caffeine; the 3.1±0.3 mm beads are able to remove 92.8 percent of caffeine; and 5.0±0.7 mm beads are able to remove 84.2 percent of caffeine.

TABLE 3-1

| Alginate:Bentonite (1:4); Beads d = 2.9 +− 0.2 mm; 50 wt % material to soln | | |
|---|---|---|
| Time (min) | % Caffeine Reduction | Concentration (mg/mL) |
| 0 | 0 | 2.384574119 |
| 2 | 54.58168288 | 1.083033435 |
| 5 | 66.94565394 | 0.788205381 |
| 10 | 80.16846654 | 0.472897614 |
| 20 | 88.68067053 | 0.269917801 |
| 30 | 91.8760077 | 0.193722618 |

TABLE 3-2

| Alginate:Bentonite (1:4); Beads d = 3.2 +− 0.3 mm; 50 wt % material to soln | | |
|---|---|---|
| Time (min) | % Caffeine Reduction | Concentration (mg/mL) |
| 0 | 0 | 2.384574119 |
| 2 | 54.32967645 | 1.089042716 |
| 5 | 73.30934616 | 0.636458424 |
| 10 | 82.1183821 | 0.426400433 |
| 20 | 88.56563094 | 0.272661005 |
| 30 | 92.79317724 | 0.17185203 |

TABLE 3-3

| Alginate:Bentonite (1:4); Beads d = 5.0 +− 0.7 mm; 50 wt % material to soln | | |
|---|---|---|
| Time (min) | % Caffeine Reduction | Concentration (mg/mL) |
| 0 | 0 | 2.384574119 |
| 2 | 40.65565005 | 1.41511001 |

TABLE 3-3-continued

| Alginate:Bentonite (1:4); Beads d = 5.0 +− 0.7 mm; 50 wt % material to soln | | |
|---|---|---|
| Time (min) | % Caffeine Reduction | Concentration (mg/mL) |
| 5 | 57.42115185 | 1.015324193 |
| 10 | 68.50477418 | 0.751027004 |
| 20 | 79.32714282 | 0.492959602 |
| 30 | 84.22377616 | 0.376195751 |

The two smaller bead sizes, 2.9±0.2 mm and 3.1±0.3 mm, show similar caffeine absorption, and the larger bead size of 5.0±0.7 mm it shows significant decrease in the caffeine absorption over the same time period. It is hypothesized that the reduced caffeine adsorption of the larger the beads is due to their lower surface-to-volume ratio, which results in less contact surface between the material and the caffeinated solution. These results demonstrate that material shapes and sizes play an important role in caffeine reduction efficiency. Particularly, higher surface-area-to-volume ratios increase caffeine absorption.

Example 9

The Effect of Caffeine Adsorbent Loading on Caffeine Adsorption

Caffeine-adsorbing materials were with varying ratios of caffeine adsorbent to crosslinked polymer were prepared as described herein.

The data, summarized in TABLES 4-1 through 4-2, show that caffeine-adsorbing materials with higher loading of caffeine absorbent tend to adsorb caffeine at a higher rate in a given caffeinated solution until the material reaches high capacity. The data shows two materials tested at the same conditions in caffeinated solution having the same concentration. One caffeine-adsorbing material has 1 part of alginate to 3 parts of bentonite composition by weight and the other one has 1 part of alginate to 6 parts of bentonite composition by weight. As shown in TABLES 4-1 and 4-2, the material that has 1 part of alginate to 6 parts of bentonite composition by weight has a faster adsorption kinetics and higher adsorption capacity.

TABLE 4-1

| Alginate:Bentonite (1:3); microbead d = 1.8 +− 0.3 mm; 22.5 wt % | | |
|---|---|---|
| Time (min) | % Caffeine Reduction | Concentration (mg/mL) |
| 0 | 0 | 0.260175871 |
| 1 | 63.61808513 | 0.094656964 |
| 2 | 76.89851028 | 0.060104502 |
| 3 | 84.01180171 | 0.041597434 |
| 5 | 83.43473919 | 0.043098812 |
| 10 | 93.92782028 | 0.015798346 |
| 20 | 95.83497638 | 0.010836386 |

TABLE 4-2

| Alginate:Bentonite (1:6); microbead d = 1.8 +− 0.3 mm; 22.1 wt % | | |
|---|---|---|
| Time (min) | % Caffeine Reduction | Caffeine Concentration (mg/mL) |
| 0 | 0 | 0.260175871 |
| 1 | 72.02099096 | 0.07279463 |
| 5 | 91.74879791 | 0.021467637 |

TABLE 4-2-continued

Alginate:Bentonite (1:6); microbead d = 1.8 +− 0.3 mm; 22.1 wt %

| Time (min) | % Caffeine Reduction | Caffeine Concentration (mg/mL) |
|---|---|---|
| 10 | 95.04314248 | 0.012896547 |
| 20 | 96.1387428 | 0.01004606 |

Example 10

Caffeine Adsorption by Representative Caffeine-Adsorbing Materials in a Variety of Caffeine-Containing Beverages Caffeine-adsorbing materials were prepared as described herein and placed in a variety of caffeine-containing beverages.

As summarized in TABLES 5-1 through 5-3, the data show that the caffeine-adsorbing material works in coffee, tea, and de-carbonated soda to adsorb caffeine.

TABLE 5-1

Alginate:Bentonite (1:4); bead; Soda; 45 wt %

| Time (min) | % Caffeine Reduction | Concentration (mg/mL) |
|---|---|---|
| 0 | 0 | 0.142152905 |
| 2 | 63.31980135 | 0.052141968 |
| 5 | 82.08686566 | 0.025464041 |
| 10 | 90.63775191 | 0.013308708 |

TABLE 5-2

Alginate:Bentonite (1:4); bead; Green Tea; 45 wt %

| Time (min) | % Caffeine Reduction | Concentration (mg/mL) |
|---|---|---|
| 0 | 0 | 0.158399055 |
| 2 | 67.5348421 | 0.051424503 |
| 5 | 82.63840769 | 0.027500598 |
| 10 | 88.26206625 | 0.018592776 |

TABLE 5-3

Alginate:Bentonite (1:4); bead coffee; 50 wt % material to soln

| Time (min) | % Caffeine Reduction | Concentration (mg/mL) |
|---|---|---|
| 0 | 0 | 2.384574119 |
| 2 | 54.58168288 | 1.083033435 |
| 5 | 66.94565394 | 0.788205381 |
| 10 | 80.16846654 | 0.472897614 |
| 20 | 88.68067053 | 0.269917801 |
| 30 | 91.8760077 | 0.193722618 |

While the preferred embodiment of the invention has been illustrated and described, it will be appreciated that various changes can be made therein without departing from the spirit and scope of the invention.

The embodiments of the invention in which an exclusive property or privilege is claimed are defined as follows:

1. A method of removing caffeine from a solution comprising:
    contacting the solution with a caffeine-adsorbing material comprising:
        a crosslinked polymer, wherein the crosslinked polymer comprises alginate and a crosslink, wherein the crosslink is a multivalent ion, and wherein the crosslinked polymer is a crosslinked hydrogel; and
        a caffeine adsorbent associated with the crosslinked polymer,
    for a time and under conditions sufficient to adsorb caffeine, thereby removing caffeine from the solution,
    wherein the caffeine-adsorbing material is thermostable at temperatures equal to or less than 150° C.

2. The method of claim 1, wherein the solution is a beverage.

3. The method of claim 2, wherein the beverage is chosen from coffee, black tea, green tea, oolong tea, white tea, pu-erh tea, dark tea, herbal tea, floral tea, chai, macha, energy drink, alcohol-based drink, mate, soda, and cocoa.

4. A caffeine-adsorbing material comprising:
    a crosslinked polymer, wherein the crosslinked polymer comprises alginate and a crosslink, wherein the crosslink is a multivalent ion, and wherein the crosslinked polymer is a crosslinked hydrogel; and
    a caffeine adsorbent associated with the crosslinked polymer,
    wherein the caffeine-adsorbing material is thermostable at temperatures equal to or less than 150° C.

5. The caffeine-adsorbing material of claim 4, wherein the multivalent ion is a multivalent metal ion chosen from a multivalent ion of calcium, magnesium, manganese, iron, copper, cobalt, nickel, zinc, barium, selenium, chromium, and molybdenum.

6. The caffeine-adsorbing material of claim 4, wherein the weight:weight ratio of the crosslink:polymer is greater than 1:100.

7. The caffeine-adsorbing material of claim 4, wherein the caffeine-adsorbing material has a smallest diameter of between about 100 nm and about 10 mm.

8. The caffeine-adsorbing material of claim 4, wherein the caffeine-adsorbing material is in a shape chosen from a bead, a string, an oval, and a plate.

9. The caffeine-adsorbing material of claim 4, wherein the caffeine adsorbent is a clay particle.

10. The caffeine-adsorbing material of claim 9, wherein the clay particle comprises a material chosen from laponite, montmorillonite, beidellite, nontronite, hectorite, saponite, sauconite, sepiolite, and combinations thereof.

11. The caffeine-adsorbing material of claim 4, wherein the caffeine adsorbent is activated carbon, and wherein the activated carbon is loaded with a sugar and an acid.

12. The caffeine-adsorbing material of claim 4, wherein the ratio of crosslinked polymer to caffeine adsorbent is between about 50:1 and about 1:50.

13. The caffeine-adsorbing material of claim 4, wherein the caffeine-adsorbing material is pH-stable at between about pH 2 and about pH 10.

14. A caffeine-adsorbing system comprising:
    a porous container; and
    a caffeine-adsorbing material disposed within the porous container, the caffeine-adsorbing material comprising:
        a crosslinked polymer, wherein the crosslinked polymer comprises alginate and a crosslink, wherein the crosslink is a multivalent ion, and wherein the crosslinked polymer is a crosslinked hydrogel; and
        a caffeine adsorbent associated with the crosslinked polymer,
    wherein the caffeine-adsorbing material is thermostable at temperatures equal to or less than 150° C.

15. The caffeine-adsorbing system of claim 14, wherein the porous container is chosen from a paper bag, a cloth bag, a silk bag, a plastic bag, a metal tea ball, a woven fabric bag, and a nonwoven fabric bag.

16. A decaffeination system comprising:
   a caffeine-containing solid; and
   a caffeine-adsorbing material comprising:
      a crosslinked polymer, wherein the crosslinked polymer comprises alginate and a crosslink, wherein the crosslink is a multivalent ion, and wherein the crosslinked polymer is a crosslinked hydrogel; and
      a caffeine adsorbent associated with the crosslinked polymer,
      wherein the caffeine-adsorbing material is thermostable at temperatures equal to or less than 150° C.

17. The decaffeination system of claim 16, wherein the caffeine-containing solid is chosen from coffee grounds, coffee crystals, coffee powder, tea leaves, and tea powder.

* * * * *

UNITED STATES PATENT AND TRADEMARK OFFICE
CERTIFICATE OF CORRECTION

Page 1 of 1

PATENT NO. : 10,813,375 B2
APPLICATION NO. : 16/095312
DATED : October 27, 2020
INVENTOR(S) : Y. Liu et al.

It is certified that error appears in the above-identified patent and that said Letters Patent is hereby corrected as shown below:

In the Drawings

1. In Figures 5 and 6, please change "POLYMER + CAFFEINE ADSORBANT" to
-- POLYMER + CAFFEINE ADSORBENT --.

In the Specification

2. In Column 3, Line 21, please change "Caffeine-Ad Sorbing Materials" to
-- Caffeine-Adsorbing Materials --.

3. In Column 5, Lines 32-35, please change "In certain embodiments, the hydrogels described herein include hydrated crosslinked hydrophilic polymers dispersed a liquid medium." to -- In certain embodiments, the hydrogels described herein include hydrated crosslinked hydrophilic polymers dispersed in a liquid medium. --.

4. In Column 9, Lines 46-47, please delete the sentence: "In certain embodiments, the non-woven porous container comprises.".

5. In Column 9, Lines 47-48, please delete the sentence: "In certain embodiments, the porous container includes.".

6. In Column 19, Table 5-3, Line 46, please change the title of the table to read: "Alginate:Bentonite (1:4); bead; Coffee; 50 wt % material to soln".

Signed and Sealed this
Thirtieth Day of March, 2021

Drew Hirshfeld
*Performing the Functions and Duties of the
Under Secretary of Commerce for Intellectual Property and
Director of the United States Patent and Trademark Office*